(12) United States Patent
Chamberlain (10) Patent No.: US 7,007,218 B2
(45) Date of Patent: Feb. 28, 2006

(54) ADAPTIVE RATE CODE COMBINING AUTOMATIC REPEAT REQUEST (ARQ) COMMUNICATIONS METHOD AND SYSTEM

(75) Inventor: Mark W. Chamberlain, Honeoye Falls, NY (US)

(73) Assignee: Harris Corporation, Melbourne, FL (US)

( * ) Notice: Subject to any disclaimer, the term of this patent is extended or adjusted under 35 U.S.C. 154(b) by 58 days.

(21) Appl. No.: 10/770,633

(22) Filed: Feb. 3, 2004

(65) Prior Publication Data

US 2005/0172197 A1 Aug. 4, 2005

(51) Int. Cl.
*H04L 1/18* (2006.01)
(52) U.S. Cl. .................................... 714/748
(58) Field of Classification Search ................ 714/18, 714/746, 748–752; 375/216, 224
See application file for complete search history.

(56) References Cited

U.S. PATENT DOCUMENTS

| | | | | |
|---|---|---|---|---|
| 5,828,677 | A * | 10/1998 | Sayeed et al. | 714/774 |
| 6,356,545 | B1 | 3/2002 | Vargo et al. | 370/355 |
| 2002/0046379 | A1* | 4/2002 | Miki et al. | 714/749 |
| 2003/0003937 | A1 | 1/2003 | Ohkubo et al. | 455/517 |
| 2003/0072286 | A1 | 4/2003 | Kim et al. | 370/335 |
| 2003/0097623 | A1 | 5/2003 | Razavilar et al. | 714/704 |
| 2003/0110436 | A1 | 6/2003 | Golitschek Elder Von Elbwart et al. | 714/748 |
| 2003/0120990 | A1 | 6/2003 | Elbwart et al. | 714/748 |
| 2003/0138059 | A1* | 7/2003 | Xu et al. | 375/316 |
| 2004/0049725 | A1* | 3/2004 | Golitschek et al. | 714/749 |

OTHER PUBLICATIONS

John M. Shea, Adapative signaling schemes with imperfect channel-quality estimates in wireless CDMA communications, 2000, IEEE, p. 851-855.*

Samir Kallel, Analysis if a Type II hybird ARQ scheme with code combining, 8-1990, IEEE Trans. on Comm., vol. 38, No. 8, p. 1133-1137.*

Justin C.I. Chauang, Comparison of two ARQ protocols in a Rayleigh fading channel , Nov. 1990, IEEE Trans. on Vehicular Tech., vol. 39, No. 4, p. 367-373.*

Kallel et al., Sequential decding with ARQ and code combining: A robust hybrid FEC/ARQ system, Jul. 1988, IEEE Trans. on Comm., vol. 36, No. 7, p. 773-780.*

* cited by examiner

*Primary Examiner*—Shelly Chase
(74) *Attorney, Agent, or Firm*—Allen, Dyer, Doppelt, Milbrath & Gilchrist, P.A.

(57) ABSTRACT

A method and system reduces data error in an automatic repeat request (ARQ) communications system. Data is code-combined in a communications session that uses an automatic repeat request protocol by sending alternate phases of an encoder state. The underlying signaling constellation is changed when code-combining performance degrades. An optimal signaling constellation and code rate can be determined from a previous packet acknowledgment (ACK) status or from a look-up table previously determined by use.

39 Claims, 6 Drawing Sheets

ADAPTIVE RATE CODE COMBINING AUTOMATIC REPEAT REQUEST (ARQ) COMMUNICATIONS METHOD AND SYSTEM

FIELD OF THE INVENTION

The present invention relates to a communications system, and more particularly, the present invention relates to an automatic repeat request (ARQ) communications system that code combines to deliver error-free data over a bandwidth constrained non-stationary fading channel.

BACKGROUND OF THE INVENTION

Automatic repeat request (ARQ) is a communications protocol that provides error control in data transmissions. A receiver detects an error in a packet and automatically requests a transmitter to resend the packet. The process is repeated until the packet is error free or in some cases, the process is repeated if the error continues beyond a predetermined number of transmissions. The phrase "admission request" is also used to describe this type of protocol, and refers to the requests to resend corrupted data. Various types of messages associated with an admission request include an admission request, an admission request confirmed (ARC), an admission request reject (ARJ) or other similar bandwidth requests that confirm and/or reject messages.

In this type of system, a positive acknowledgment (ACK) can be returned when data is received correctly and a negative acknowledgment (NAK) can be returned when the error is detected. Different types of automatic repeat requests can occur, including a stop-and-wait, go-back-N, and selective-reject.

There are different types of ARQ schemes, commonly known as Type I, Type II, and Type III. In Type I, erroneous received packets are discarded and a new copy of the same packet is retransmitted and decoded separately. There is no combining of earlier and later received versions. In Type II, any erroneous received packets are not discarded, but are combined with additional retransmissions for subsequent decoding. In Type III, each transmitted packet is self-decodable without combining with previous packets.

It is also possible to reuse the redundancy of previously transmitted packets by soft-combining, co-combining and a combination of soft- and co-combining. Co-combining concatenates any received packets to generate a new code word and a decoder combines the transmissions at each retransmission instant to perform a correct decoding when the code rate depends on retransmission. In a combination of soft- and co-combining, retransmitted packets carry some symbols/bits identical to previously transmitted symbols/bits and some co-symbols/bits are different from these. Examples of ARQ systems are found in U.S. published patent application Nos. 2003/0097623; 2003/0120990; and 2003/0072286.

Automatic repeat requests are often used in high frequency radio communications, including "short wave" radio communications between about 3 and 30 MHz, and in much higher frequency radio communications in the gigahertz range. The automatic repeat request protocol is often used in multi-band tactical radio systems to provide reliable tactical communications for secure voice and data transmission and networking capability. For example some advanced high frequency/very high frequency/ultra high frequency (HF/VHF/UHF) radio systems have high speed data rates up to about 9,600 Bps (HF) or more and selectable ARQ modes for reduced on-the-air transmission time, while also providing enhanced and more secure data transmissions to improve communications. Some of these systems include a serial tone data modem that can operate over poor communication channels. For example, the growth of high frequency (HF) networking throughout the 1980s and mid-1990s required a more efficient protocol such that the limited HF spectrum would support larger networks and greater amounts of data traffic.

Third-generation communications protocols have now become established and include NATO STANAG-4538, the disclosure which is hereby incorporated by reference in its entirety. Third-generation improvements include higher data throughput, automatic link establishment (ALE), increased channel capacity, quicker link establishment, and improved signal-to-noise ratio (SNR). Various systems in a third-generation ALE include the use of linking, and use of data transfer protocol units, burst PSK waveforms, multi-channel access, and Carrier Sense Multi-Access with Collision Avoidance (CSMA/CA) channel access procedures. Any software used by radios and base stations typically connect to an Ethernet-PCP/IP local area network, in which a radio could operate as a "radio" and mail server and allow delivery of e-mail and files across multiple transmission media including any HF/VHF/UHF radio, LAN, landline, microwave, or satellite systems. Such systems could form a wireless gateway with wireless message terminals.

Many of the modems used in these systems are especially susceptible to frequency shifts and frequency-spread and multi-path distortions. Modern communication systems set a high level of bit error rate (BER) performance for these modems and other equipment. For example, transmission rates could be very high and high-level protocols could use adaptive controlling of the transmission rate and increase data transmission reliability under poor conditions. These automatic repeat request communication systems as described sometimes have high error rates in the presence of severe inter-symbol interference and channel noise and adaptive channels.

SUMMARY OF THE INVENTION

It is therefore an object of the present invention to improve the data throughput of an automatic repeat request system in the presence of severe inter-symbol interference and channel noise.

The present invention adapts a signaling constellation while code-combining decisions from a decoder to overcome the effects of the channel interference. The present invention allows an estimation of the correct signal constellation to code-combine efficiently even when noise conditions are dynamic. An algorithm of the present invention correctly increases the degree of the constellation and coding scheme when channel conditions improve, while still allowing the soft-decisions from various constellations to be code-combined together. The present invention automatically adapts the code-combining system to the noise level present on the channel but also can be supplied with channel information for quicker adaptation.

An uncoded waveform sends alternate phases of the encoder state (systematic or non-systematic codes). Code-combining works until the fundamental uncoded transport wave form reaches an uncoded bit-rate of 0.5 in one aspect of the present invention. Below this point in the signal-to-noise ratio, no additional coding or repetition can be combined to clear the packet. As the operation point approaches an uncoded bit-error rate of 0.5 of the underlying waveform, the worst code combining performs. More combinations are necessary the closer to the uncoded bit-error rate of 0.5 than were necessary above this point. Resending forward transmissions is not free and time is spent sending the ACK/NAK signaling status over the back channel, which increases the packet delivery time. Therefore, the present invention changes the underlying signaling constellation when code-combining degrades. The high-rate data waveform is coupled with control information using a low-rate robust signaling. Data is interleaved over an entire packet to improve performance for channels that experience fading.

In accordance with the present invention, a method reduces data error in an automatic repeat request (ARQ) communication system by code-combining data in a communications session that uses the ARQ protocol by sending alternate phases of an encoder state and changing the underlying signaling constellation when code-combining performance degrades. An optimal signaling constellation and code rate can be determined from a previous packet acknowledgment (ACK) status or from a look-up table of previously determined values. A signaling constellation, code rate and packets to be transmitted are encoded and transmitted in a control burst to a receiver. Training data and a fixed number of unknown blocks of symbols can also be transmitted after transmitting the control burst. Data packets can be mapped to an integer number of unknown blocks. Packets can be cleared from the communications channel and an ACK—ACK burst transmitted to indicate that a file transfer has been completed. A puncture pattern of a convolution code can be varied to achieve a desired code rate. The code rate can be formed as R=1, R=0.75 and R=0.5. Data can also be interleaved over an entire packet to be transmitted to improve the viterbi decoder performance to burst errors.

A method of the present invention also reduces data errors and encodes a signaling constellation, code rate and packet to be transmitted based on an optimal signaling constellation and code rate. The encoded signaling constellation, code rate, and packets are transmitted in a control burst through a receiver. The encoded information is decoded at the receiver and information about the signal-to-noise ratio and Doppler spread are estimated. Information on the signal-to-noise ratio and Doppler spread are encoded and the encoded information transmitted in an ACK burst along with a current packet decode status.

In yet another aspect of the present invention, signal-to-noise ratio and Doppler spread estimates are obtained for communications channel conditions that exist between a sender and receiver. The signal-to-noise ratio and Doppler spread estimates are combined with data regarding previous traffic on the communications channel. An initial signaling constellation and coding rate are selected for the communications channel. Code-combining occurs during the communications session by sending alternate phases of an encoder state. The underlying signaling constellation is changed when code-combining performance degrades.

In yet another aspect of the present invention, a transmitter has an encoder that encodes a signaling constellation, code rate and packets to be transmitted based on an optimal signaling constellation and code rate using an automatic repeat request (ARQ) communications protocol and transmits the encoded signaling constellation, code rate and packets in a controlled burst along a communications channel. A receiver receives the control burst and includes a decoder/encoder that decodes the information and estimates information about the signal-to-noise ratio and Doppler spread and encodes information on the signal-to-noise ratio and Doppler spread and transmits the encoded information along the communications channel in an ACK burst along with a current packet decode status.

BRIEF DESCRIPTION OF THE DRAWINGS

The invention will be described with reference to the following drawings, in which like elements are designated by like numberss and in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is a system and method for improving the error-free data throughput of an Automatic Repeat Request (ARQ) communications system in the presence of severe inter-symbol interference and channel noise. The present invention adapts the signaling constellation while code-combining soft decisions from the decoder to overcome the effects of the channel interference. The present invention also permits estimation of the correct signal constellation to code-combine efficiently, even when the noise conditions are dynamic. An algorithm of the present invention correctly increases the degree of the constellation and coding scheme when channel conditions improve, while still allowing the soft-decision from various constellations to be code-combined together. The algorithm automatically adapts the code-combining system to the noise level present on the channel, but can also be seeded (or supplied) with channel information for quicker adaptation.

Figure 1A:
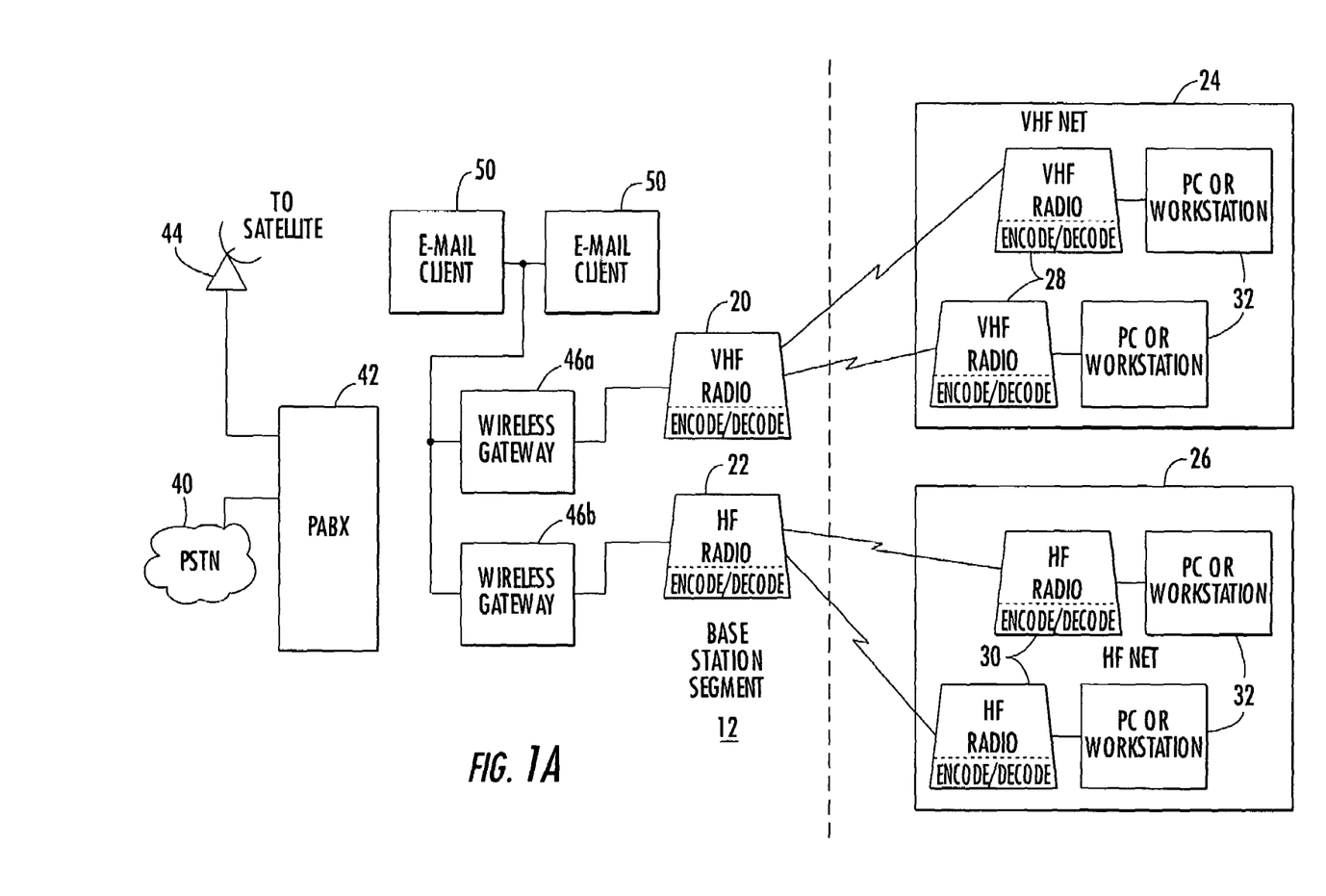
FIG. 1A is a block diagram of a communication system that includes a wireless gateway and wireless message terminal showing various components that could be incorporated for use with the present invention as non-limiting examples.

FIG. 1A is a high level block diagram of a communications system 10 that includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF radios 28 and HF radios 30, and personal computer workstations 32 connected to the radios 28, 30. The base station segment 12 includes a landline connection to a public switched telephone network (PSTN) 40, which connects to a PABX 42. A satellite interface 44 such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50.

An Ethernet/TCP-IP local area network could operate as a "radio" mail server. E-mail messages could be sent over radio links and local air networks using STANAG-5066 as second-generation protocols/waveforms (the disclosure which is hereby incorporated by reference in its entirety) and, of course, preferably with the third-generation interoperability standard: STANAG-4538. An interoperability standard FED-STD-1052 (the disclosure which is hereby incorporated by reference in its entirety) could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

The present invention is an ARQ adaptation scheme that improves the performance of classical code combining. In the present invention, code-combining can be generally defined as a weighted combination of soft-decisions from a decoder over an interval of time (and redundancy), which is necessary for a given block of data to be decoded correctly. This code-combining process can be wrapped within an ARQ system that combines multiple blocks of data using sufficient coding and repetition until the block of data is received error free. The ARQ system of the present invention is an improvement because it does not waste negatively acknowledged energy. If a packet does not clear a decoder, old signal energy along with new is used to clear the packet the next time it is received.

For purposes of background understanding, various signaling issues associated with the present invention are first discussed. The simple code-combining system uses an uncoded waveform to send alternate phases of the encoder state (systematic, or non-systematic codes work well). Code combining will work until the fundamental uncoded transport waveform reaches an uncoded bit-rate of about 0.5. Below this signal-to-noise (SNR) point, no additional coding or repetition can be combined to clear the packet. As the operation point approaches an uncoded bit error rate (BER) of about 0.5 of the underlying waveform, the worst code combining performs. More combinations are necessary the closer to the uncoded BER of 0.5 than were necessary above this point. Resending forward transmissions is not free, and time is spent sending the ACK/NAK signaling status over the back channel. This increases the packet delivery time.

A solution to this code-combining inefficiency described above is to change the underlying signaling constellation when code-combining performance degrades. Using the best constellation over the range of SNR and channel Doppler Spread would improve performance over a system that held the constellation fixed. Adaptively changing the constellation would increase the range in which code combining performs well and could also minimize the number of resends or retransmissions necessary to overcome the effects of the channel. Estimating the SNR and Doppler Spread accurately enough to select the appropriate constellation and coding degree is complicated, however. If one had this channel information, the above proposed system would run near ideal.

The present invention estimates an appropriate constellation without requiring SNR and Doppler Spread information except initially. Instead, the present invention uses the average number of packet resends required to clear a packet. This method of the present invention is robust because its adaptation methodology does not require estimated channel parameters. When good side channel information is available, however, it can be used to reduce the initial adaptation time experienced when first arriving on a new channel.

The present invention solves the problem of effectively combining different constellations along with various code rates. The system of the present invention combines "bit" soft-decisions while holding the number of bits in a packet constant. The technique varies the number of symbols based on the constellation and desired code rate. The system also varies the puncture pattern of a convolution code to achieve the following code rates (R=1, R=0.75, R=0.5).

The following constellations and coding schemes have been determined to be operative in the present invention:
   Degree 0=2-ary PSK with ½ rate code;
   Degree 1=2-ary PSK with ¾ rate code;
   Degree 2=4-ary PSK with ¾ rate code;
   Degree 3=8-ary PSK with ¾ rate code;
   Degree 4=16-QAM with ¾ rate code;
   Degree 5=64-QAM with ¾ rate code; and
   Degree 6 is an alternating encoder phase method achieving R=1 on the first send, and R=½ on the second using QAM64.

The present invention also interleaves data over the entire packet to improve performance for channels that experience fading. The high-rate data waveform is coupled with control information using a low-rate robust signaling, such as is described in NATO STANAG-4538, Appendix C, the disclosure which is hereby incorporated by reference in its entirety. The combination of these two waveforms allows the adaptation algorithm to work seamlessly. The receiving system can receive the control burst and automatically configure itself into the proper demodulation and decoding state required for the current adaptation setting. The system allows each forward transmission to have a different constellation and coding technique.

Data packet information is also provided within each packet to allow for a cyclic redundancy check (CRC) validation. A sequence number is provided within the packet data to allow packets to be re-ordered into the proper message sequence. The sequence number also provides a mechanism for catching duplicate packets, which can occur when back-channel information is missed due to severe fading.

Figure 1B:
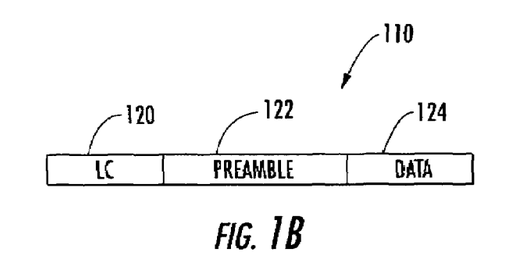
FIG. 1B is a block diagram showing the format of a control signal described as a burst due to a short on-the-air duration, in accordance with the present invention.

Referring now to FIG. 1B, the elements of the burst waveform 110 at the lowest level are shown. The LC section 120 is formed as signaling data that allows radio transmit gain control (TGC) and received radio automatic gain control (AGC) to reach steady state before the preamble 122 is demodulated. The preamble section 122 is a unique random sequence that allows time synchronization, frequency offset estimation, and channel estimation for the data demodulation process. The data section 124 contains the control data payload that is used to provide the intelligent signaling of the protocol. Details of this signaling can be found in the previously cited NATO standard STANAG-4538, Appendix C.

Figure 2:
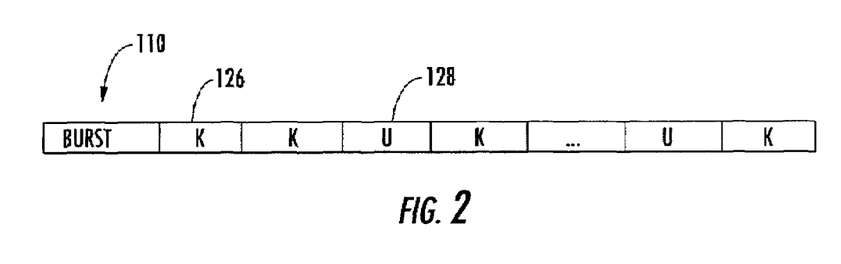
FIG. 2 is a block diagram showing an example of signaling used in a high-rate forward data bearing waveform, in accordance with the present invention.

FIG. 2 illustrates the forward high-rate waveform of the ARQ protocol. The waveform includes the control burst 110 shown in FIG. 1 along with channel training data and multiple blocks of known (k) and unknown (u) symbols 126, 128. The unknown symbols 128 are modulated using various constellations as described for the present invention. The known symbols 126 are fixed known data used to track the time-varying channel. Various numbers of data packets are mapped to an integer number of unknown blocks. Information concerning the constellation type, code rate, and the number of forward packets in the current transmission is encoded within the beginning burst data payload and is used to automate data reception.

Figure 3:
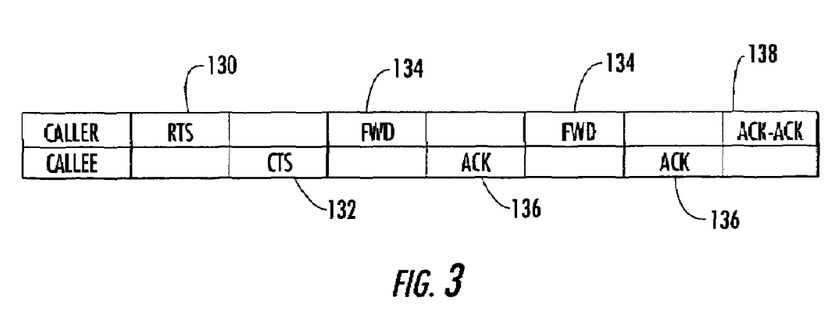
FIG. 3 is a block diagram showing an example of the type of on-air signaling used to transfer a data file, in accordance with the present invention.

FIG. 3 illustrates a file transfer sequence using the protocol and method of the present invention. A two-way handshake corresponding to a Ready-to-Send (RTS) 130 and Clear-to-Send (CTS) 132 is exchanged to initiate the intent to send data. Data is forwarded using a simple ARQ protocol, sending data until all packets have cleared the channel as shown by the forward (FWD) 134 and acknowledge (ACK) 136 blocks. The appropriate ACKs are generated during this process. Finally, an ACK—ACK burst 138 is sent in the forward direction to inform the receiving site that all packets have been cleared, while the sender acknowledges that the file transfer is completed.

Figure 4:
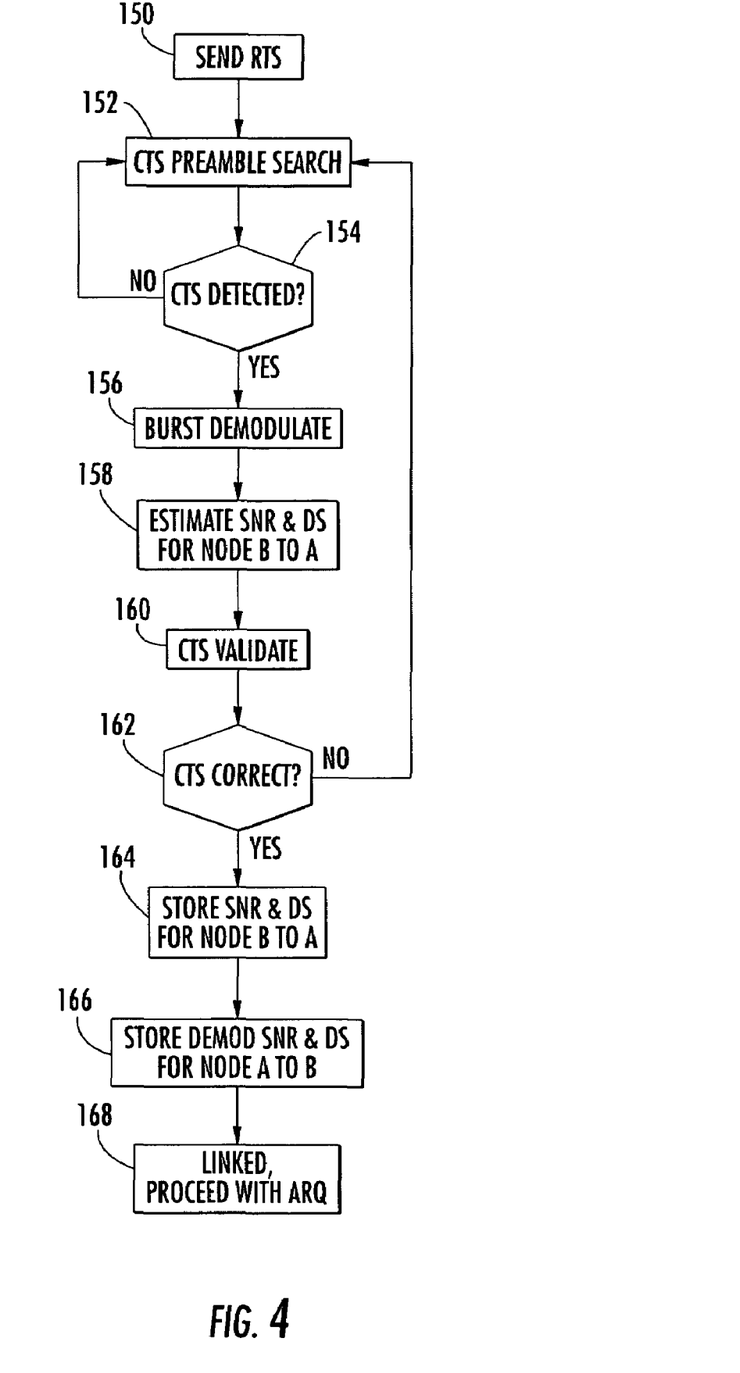
FIG. 4 is a high level flowchart of an example of the calling or sending site's traffic arbitration signaling behavior, in accordance with the present invention.

FIG. 4 shows a high level flowchart depicting the process flow algorithm when the calling site intends to send data. The calling site initiates the process by transmitting a RTS burst (Block 150). Once sent, the calling site enters a CTS preamble search for a period of time (Block 152). If the CTS preamble search determines that the CTS has been detected (Block 154), then the burst is demodulated (Block 156). If the CTS is not detected, the CTS continues its search (Block 152). Once the burst is demodulated, the signal-to-noise ratio and Doppler spread are estimated for the node from B to A (Block 158). CTS validation occurs (Block 160), and if the CTS is correct (Block 162), the SNR and Doppler spread are stored for node B to A (Block 164). If not, then the CTS preamble search continues (Block 152). Once the SNR and Doppler spread for node B to A are stored at Block 164, the demodulated SNR and Doppler spread are stored for node A to B (Block 166). The linking occurs and the algorithm proceeds with the automatic repeat request (ARQ) (Block 168).

In operation, if the CTS is detected and is properly verified as authentic, the calling radio will then proceed with a data transfer. The calling radio uses the data within the CTS data payload to obtain SNR and Doppler Spread estimates for the channel conditions that exist currently between the caller to the callee channel. The SNR and Doppler Spread information is combined with history data stored from previous traffic on the channel to select the initial constellation and coding rate for the initial first time on channel condition. This is the only time the algorithm uses SNR and Doppler Spread information to select the constellation and code rate.

Figure 5:
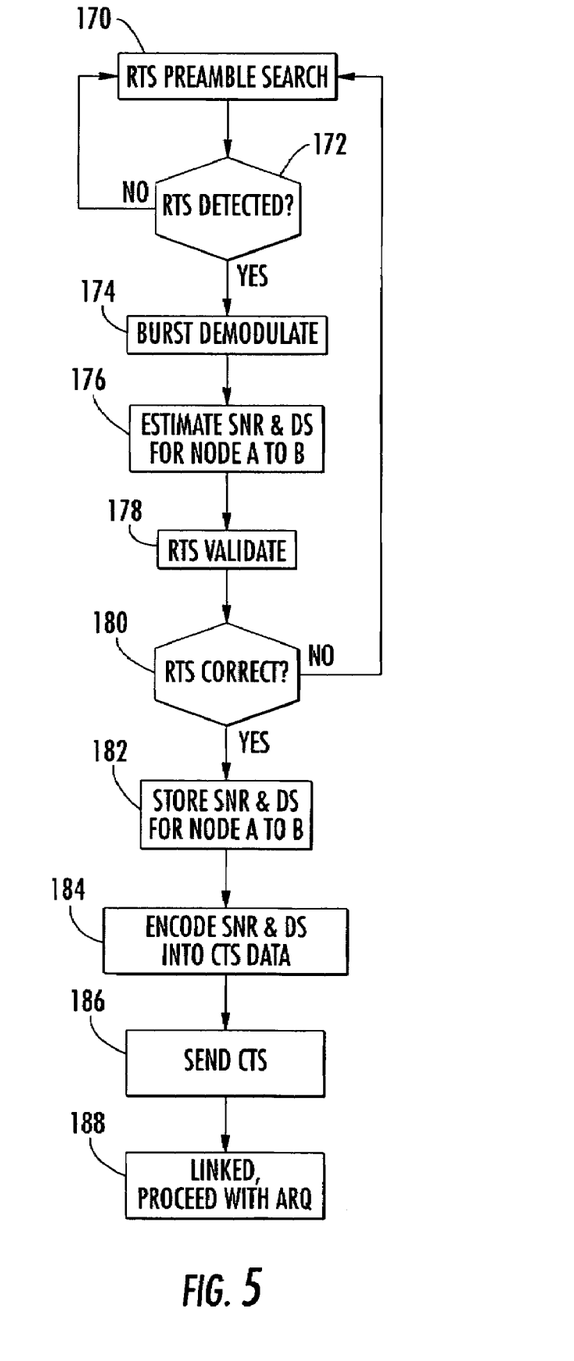
FIG. 5 is a high level flowchart of an example of the callee or receiving site's traffic arbitration signaling behavior, in accordance with the present invention.

FIG. 5 is a high level flow chart that shows the processing involved at the receiver as a complement to the processing shown in FIG. 4 above. Processing of the SNR and Doppler Spread estimation and encoding is shown. Only if the RTS is verified does the receive site allow data traffic to commence. In FIG. 5 at the receive end the RTS preamble search begins (Block 170) and if the RTS is detected (Block 172) the burst is demodulated (Block 174). The SNR and Doppler Spread are estimated from node A to B (Block 176) and the RTS invalidated (Block 178). If the RTS is not correct (Block 180) the RTS preamble search occurs (Block 170). If the RTS is correct, then the SNR and Doppler Spread for node A to B are stored (Block 182). The SNR and Doppler Spread are encoded into the CTS data (Block 184). The CTS is forwarded (Block 186) and the communications link occurs. The automatic repeat request protocol continues (Block 188).

Figure 6:
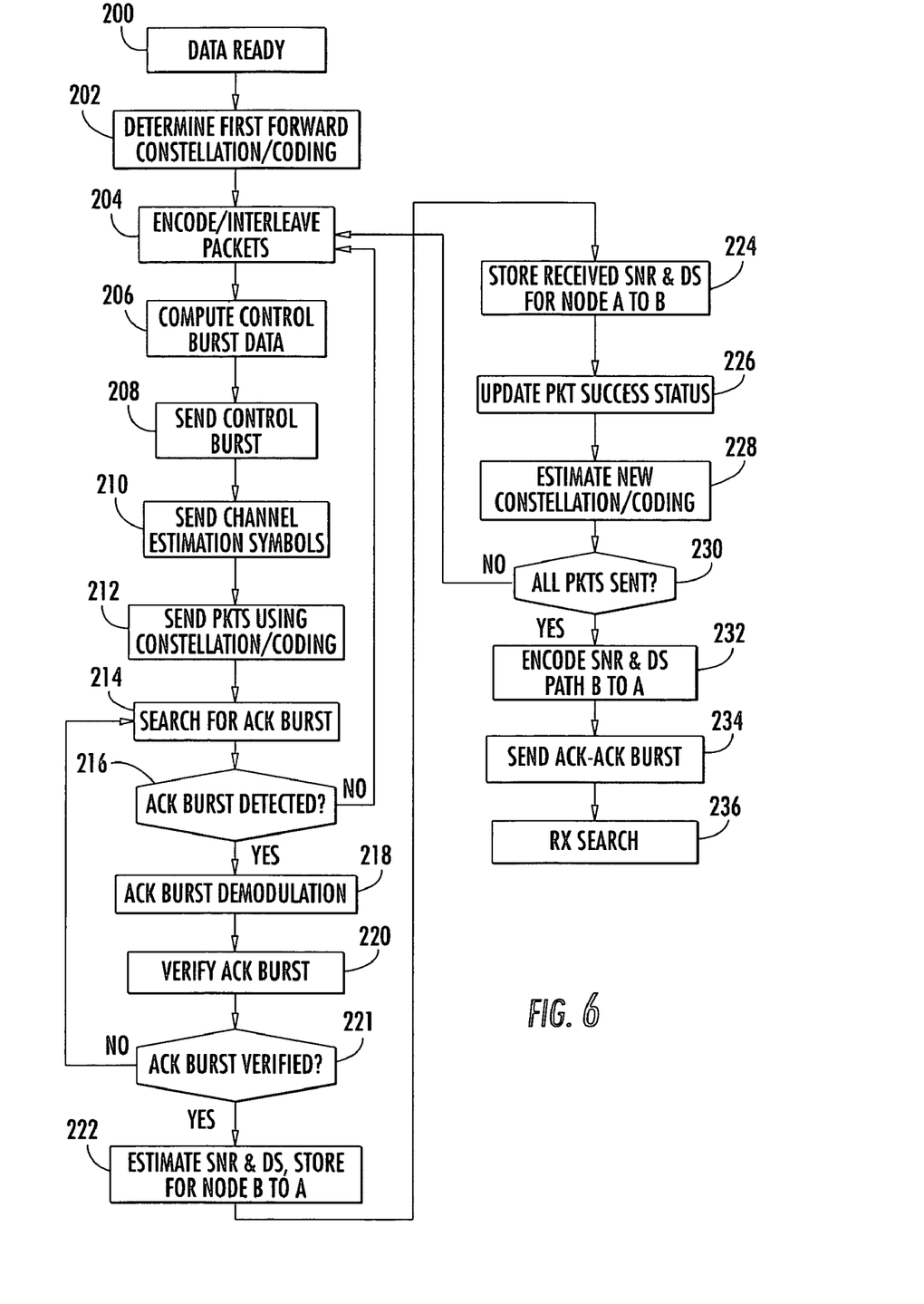
FIG. 6 is a high level flowchart of an example of how data is sent corresponding a sending site's signaling behavior, in accordance with the present invention.

FIG. 6 shows a high level flow chart of the data transfer from a caller or other sender. This is one aspect of the code-combining ARQ system of the present invention. By querying or investigating the previous packet ACK status or through a table look-up, the optimal constellation and code-rate can be selected. The constellation, code-rate, and the number of forward packets is encoded and transmitted in the control burst, followed by training data and a fixed number of unknown (UK) blocks of symbols. Once the forward blocks of UK symbols are transmitted, the caller enters search looking for the ACK burst for a fixed interval of time. The ACK burst controls the sending of new data packets as packets are positively acknowledged over the channel. This process continues until all packets clear the channel at which time the caller transmits the ACK—ACK burst to inform the callee that the last ACK burst was correct and that the file transfer is now completed. Only the first transmission from SCAN uses SNR or Doppler Spread to estimate the constellation and code rate selection. It is the rate in which packets are positively ACKed over the channel that determines the constellation and code rate selection process for the remainder of the file transfer.

As shown in FIG. 6, if data is ready (Block 200), the first forward constellation encoding is determined (Block 202). The packets are encoded and interleaved (Block 204) and the control burst data computed (Block 206). The control burst is sent (Block 208) and channel estimation symbols sent (Block 210). Packets are sent using the constellation encoding (Block 212) and a search for the acknowledgment burst occurs (Block 214). If the acknowledgment is not detected (Block 216), then the encoding and interleaving of packets occurs again (Block 204). If the acknowledgment burst is detected at Block 216, then the acknowledgment burst is demodulated (Block 218). The acknowledgment is then verified (Block 220) and when verified (Block 221), the SNR and Doppler Spread are estimated and stored for node B to A (Block 222). If the acknowledgment burst is not verified at Block 221, then the search continues for the acknowledgment burst (Block 214). The received SNR and Doppler Spread for node A to B are stored (Block 224) and the packet success status is updated (Block 226). The new constellation and coding are estimated (Block 228) and a determination is made whether all packets are sent (Block 230). If not, then the encoding and interleaving of packets continues as at Block 204. If all packets are sent the SNR and Doppler Spread for path B to A are encoded (Block 232). The ACK—ACK burst is forwarded (Block 234) and a receiver search is initiated (Block 236).

Figure 7:
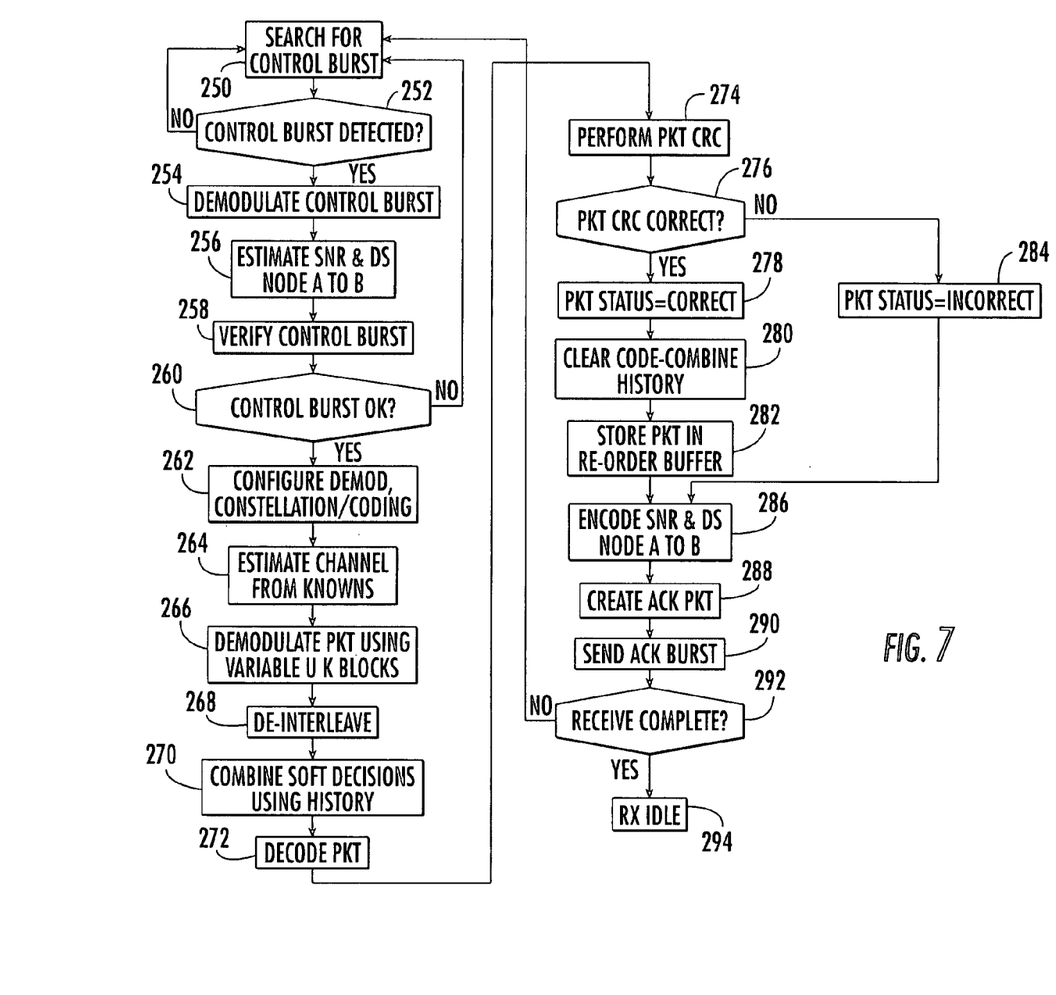
FIG. 7 is a high level flowchart of an example of how data is received corresponding to a receiving site's signaling behavior, in accordance with the present invention.

FIG. 7 illustrates the processing at the data receiver end for the present invention. A transfer begins with the first reception of a valid control burst. All information required to demodulate properly the signal is encoded within this control packet. Once validated, each packet is demodulated into the appropriate soft-decisions and de-interleaved. Any de-interleaving of soft-decisions are combined with a history of soft-decisions and sent to the decoder. The packet cyclic redundancy check is verified and correct packets are stored in a reordering buffer. The soft decision buffer history is then dumped for packets the cleared CRC. This process continues over the number of packets in the forward direction. The SNR and Doppler Spread are estimated and encoded to be sent back over the channel in the ACK burst along with the current packet decode status. Once the ACK packet is sent, the receiving site again enters a burst search. This process continues until all packets clear the decoder and the ACK—ACK burst is received.

FIG. 7 shows a high level flow chart depicts this process. A search for the control burst occurs (Block 250) and if the control burst is detected (Block 252), the control burst is demodulated (Block 254). If the control burst is not detected, the search for the control burst continues as at Block 250. Once the control burst is demodulated at Block 254, the SNR and Doppler Spread are estimated for node A to B (Block 256). The control burst is verified (Block 258) and if the control burst is acceptable (Block 260), the demodulation, constellation/coding is configured (Block 262). If the control burst is not acceptable, the search for the control burst continues as at Block 250.

Once the demodulation, constellation/coding are configured, the channel is estimated from the known parameters (Block 264). The packet is demodulated using variable UK blocks (Block 266). De-interleaving occurs (Block 268) and soft-decisions are combined using the history of previous occurrences (Block 270). The packet is decoded (Block 172) and a cyclic redundancy check (CRC) is performed on the packet (Block 274). If the packet CRC is correct (Block 276), the packet status is considered correct (Block 278). At this point a clear code-combined history is investigated (Block 280) and the packet stored in a reorder buffer (Block 282). The SNR and Doppler Spread are encoded for node A to B (Block 286) and the ACK packet created (Block 288). The ACK burst is sent (Block 290) and if the receipt is complete (Block 292), the receiver is idle (Block 294). If the ACK burst that had been previously forwarded at Block 290 is not acceptable, then the search for the control burst occurs. If the packet CRC had not been corrected at Block 276, then the packet status is considered incorrect (Block 284) and the SNR and Doppler Spread for node A to B is encoded as at Block 286.

A summary of the algorithm in code is given below.

Algorithm Summary

```
The main processing steps in the execution of the invention is set
forth below and can be understood relative to the flow chart shown in
with FIGS. 4–7.
1. Initial constellation selection first time on channel without
history.
If(codeSNR>15)codedSNR=15
If(codedSNR<0)coded SNR=0
best=0x7fffffff
codedFileSize=0
for(i=0;i<4;i++)
{
   temp=labs(fileSizeInBytes-(i+1)*256L)
   if(temp<best)
   {
      best=temp
      codedFileSize=i
   }
}
temp=HDLPLUS_TYPE_TABLE(codedFileSize*16+codedSNR]
ConstellationDegree=(temp>>(codedDS*3))&7
2. Note that the value of ADAPT_REF ranges from values greater than
1.0 to 2.0. Values close to 1.0 are preferred for AWGN channels,
while values closer to 2.0 are preferred for fading channels. A
fixed value can be used to provide the best of both, or this value
can be updated using SNR variance (1+MAX(SNR var,1)).
TooMany Forwards=0
For(i=0;i<num_pkts_in_forward;i++)
{
   if(pkt_status[i]==1)
   {
      if(oldpktcount[i]==ADAPT_REF)
      {
         oldpktcount[i]=1.0
      }
      AvgNumberOfBCAckToClearPkt=0.5* oldpktcount[i] +
               0.5*AvgNumberOfBCAckToClearPkt
      oldpktcount[i] +=1.0
      if(oldpktcount[i]>=TOO_MANY_FAILED PKT_LIMIT) TooManyForwards=1
   }
}
if((TooManyForwards)&&(ConstDegree>2.0))
{
   ConstDegree=ConstDegree - 1.0
   For(i=0;<MAX_PKT_LEN;i++)oldpktcount[i]=ADAPT_REF
}
if(AvgNumberOfBCAckToClearPkt==1.0)
```

-continued

Algorithm Summary

```
ConstDegree = ConstDegree + ADAPT_C_TAU1 * (ADAPT_REF -
   AvgNumberOfBCAckToClearPkt)
Else
   ConstDegree = ConstDegree + ADAPT_C_TAU2 * (ADAPT_REF -
   AvgNumberOfBCAckToClearPkt)
If(ConstDegree<MIN_CONST_DEGREE) ConstDegree = MIN_CONST_DEGREE
If(ConstDegree>MAX_CONST_DEGREE) ConstDegree = MAX_CONST_DEGREE
If((DS>=AWGN_DS) && (ConstDegree>UNCODED_CONST_DEGREE))
   ConstDegree=UNCODED_CONST_DEGREE
```

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of reducing data error in an automatic repeat request (ARQ) communications system comprising the steps of:
   code-combining data in a communications session that uses an automatic repeat request protocol by sending alternate phases of an encoder state;
   determining an optimal signaling constellation and code rate; and
   changing an underlying signaling constellation when code-combining performance degrades.

2. A method according to claim 1, and further comprising the step of clearing all packets from the communications channel and transmitting an Acknowledgement—Acknowledgement (ACK—ACK) burst to indicate that a file transfer has been completed.

3. A method according to claim 1, and further comprising the step of combining different signaling constellations with different code rates.

4. A method according to claim 1, and further comprising the steps of varying symbols based on a desired signaling constellation and code rate.

5. A method according to claim 1, and further comprising the step of varying a puncture pattern of a convolution code to achieve a desired code rate.

6. A method according to claim 5, wherein code rate comprises R=1, R=0.75 and R=0.5.

7. A method of reducing data error in an automatic repeat request (ARQ) communications system comprising the steps of:
   encoding a signaling constellation, code rate and packets to be transmitted based on an optimal signaling constellation and code rate;
   transmitting the encoded signaling constellation, code rate and packets in a control burst to a receiver;
   decoding the encoded information at the receiver;
   estimating information about the signal-to-noise ratio and Doppler spread;
   encoding the information on a signal-to-noise ratio and Doppler spread; and
   transmitting the encoded information along a communications channel in an Acknowledgement (ACK) burst along with a current packet decode status.

8. A method according to claim 7, and further comprising the step of transmitting training data and a fixed number of unknown blocks of symbols after transmitting the control burst.

9. A method according to claim 8, and further comprising the step of mapping data packets to an integer number of unknown blocks.

10. A method according to claim 7, and further comprising the step of searching for an ACK burst until an ACK—ACK burst is received indicating that all packets have cleared a decoder.

11. A method according to claim 7, and further comprising the step of determining an optimal signaling constellation and code rate from a previous packet Acknowledgement (ACK) status or from a look-up table of previously determined values.

12. A method according to claim 7, and further comprising the step of acknowledging packets transmitted over the communications channel and controlling the transmission of new packets as transmission of packets are acknowledged.

13. A method according to claim 7, and further comprising the step of clearing all packets from the communications channel and transmitting an Acknowledgement—Acknowledgement (ACK—ACK) burst to indicate that a file transfer has been completed.

14. A method according to claim 7, and further comprising the step of combining different signaling constellations with different code rates.

15. A method according to claim 7, varying symbols based on a desired signaling constellation and code rate.

16. A method according to claim 7, and further comprising the step of varying a puncture pattern of a convolution code to achieve a desired code rate.

17. A method according to claim 16, wherein code rate comprises R=1, R=0.75 and R=0.5.

18. A method according to claim 7, and further comprising the step of interleaving data over an entire packet.

19. A method of reducing data error in an automatic repeat request communications system comprising the steps of:
   obtaining signal-to-noise ratio and Doppler spread estimates for communications channel conditions that exist between a sender and receiver;
   combining the signal-to-noise ratio and Doppler spread estimates with data regarding previous traffic on a communications channel;
   selecting an initial signaling constellation and coding rate for the communications channel;
   code-combining during a communications session by sending alternate phases of an encoder state; and
   changing an underlying signaling constellation when code-combining performance degrades.

20. A method according to claim 19, and further comprising the step of determining an optimal signaling constellation and code rate from a previous packet Acknowledgement (ACK) status or from a look-up table of previously determined values.

21. A method according to claim 19, and further comprising the step of encoding the signaling constellation, code rate and packets to be transmitted and transmitting the encoded signaling constellation, code rate and forward packets in a control burst.

22. A method according to claim 21, and further comprising thestep of transmitting training data and a fixed number of unknown blocks of symbols.

23. A method according to claim 22, and further comprising the step of mapping data packets to an integer number of unknown blocks of symbols.

24. A method according to claim 23, and further comprising the step of clearing all packets from the communications channel and transmitting an ACK—ACK burst to indicate that a file transfer has been completed.

25. A method according to claim 21, and further comprising the step of combining different signaling constellations with different code rates.

26. A method according to claim 19, varying symbols based on a desired signaling constellation and code rate.

27. A method according to claim 19, and further comprising the step of varying a puncture pattern of a convolution code to achieve a desired code rate.

28. A method according to claim 27, wherein code rate comprises R=1, R=0.75 and R=0.5.

29. A method according to claim 19, and further comprising the step of interleaving data over an entire packet.

30. An automatic repeat request communications system comprising:
a transmitter having an encoder that encodes a signaling constellation, code rate and packets to be transmitted based on an optimal signaling constellation and code rate using an automatic repeat request communications protocol and transmits the encoded signaling constellation, code rate and packets in a control burst along a communications channel; and
a receiver that receives the control burst, said receiver including a decoder/encoder that decodes the information and estimates information on a signal-to-noise ratio and Doppler spread and encodes information on the signal-to-noise ratio and Doppler spread and transmits the encoded information along a communications channel in an ACK burst along with a current packet decode status.

31. An automatic repeat request communications system according to claim 30, and further wherein a control burst that is transmitted comprises channel training data and multiple blocks of known and unknown symbols.

32. An automatic repeat request communications system according to claim 31, wherein said blocks of known symbols comprise fixed known data used to track a time-varying channel.

33. An automatic repeat request communications according to claim 31, wherein said blocks of unknown symbols comprise modulated data using various signaling constellations.

34. An automatic repeat request communications according to claim 33, and further comprising a plurality of data packets mapped to an integer number of blocks of unknown symbols.

35. A method of reducing data error in an automatic repeat request (ARQ) communications system comprising the steps of:
code-combining data in a communications session that uses an automatic repeat request protocol by sending alternate phases of an encoder state;
changing an underlying signaling constellation when code-combining performance degrades; and
determining an optimal signaling constellation and code rate from a previous packet Acknowledgement (ACK) status or from a look-up table of previously determined values.

36. A method of reducing data error in an automatic repeat request (ARQ) communications system comprising the steps of:
code-combining data in a communications session that uses an automatic repeat request protocol by sending alternate phases of an encoder state;
changing an underlying signaling constellation when code-combining performance degrades; and
encoding a signaling constellation, code rate and packets to be transmitted and transmitting the encoded signaling constellation, code rate and packets in a control burst to a receiver.

37. A method according to claim 36, and further comprising the step of transmitting training data and a fixed number of unknown blocks of symbols after transmitting the control burst.

38. A method according to claim 37, and further comprising the step of mapping data packets to an integer number of unknown blocks.

39. A method of reducing data error in an automatic repeat request (ARQ) communications system comprising the steps of:
code-combining data in a communications session that uses an automatic repeat request protocol by sending alternate phases of an encoder state;
changing an underlying signaling constellation when code-combining performance degrades; and
interleaving data over an entire packet to be transmitted.

* * * * *